Figure 1:
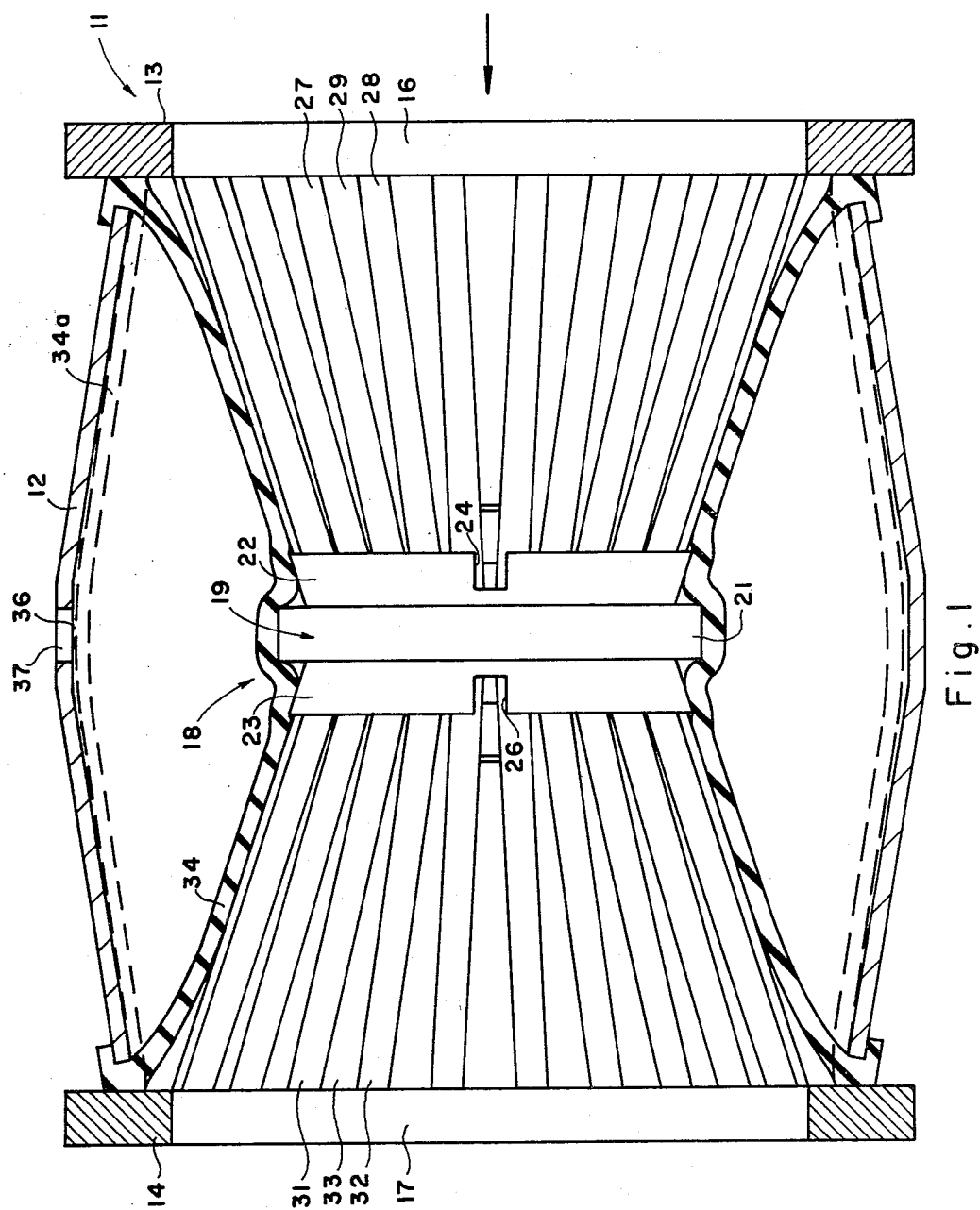

United States Patent [19]
Zakai

[11] 4,451,023
[45] May 29, 1984

[54] TUBE-DIAPHRAGM VALVE

[75] Inventor: Avi Zakai, Rishon Le-Zion, Israel

[73] Assignee: Mil Mutzarim Techniim (1971) B.M., Holon, Israel

[21] Appl. No.: 300,125

[22] Filed: Sep. 8, 1981

[51] Int. Cl.³ .............................................. F16K 7/07
[52] U.S. Cl. ........................................ 251/5; 251/61.1
[58] Field of Search ................... 251/5, 61.1, 331; 137/513.5, 496, 859

[56] References Cited

U.S. PATENT DOCUMENTS

| | | | |
|---|---|---|---|
| 2,489,623 | 11/1949 | Delany | 251/210 |
| 3,272,470 | 9/1966 | Bryant | 251/5 |
| 3,690,344 | 9/1972 | Brumm | 251/5 X |
| 3,838,704 | 10/1974 | Johnson | 251/5 X |
| 3,942,756 | 3/1976 | Brumm et al. | 251/61.1 X |
| 4,050,669 | 9/1977 | Brumm | 251/5 |
| 4,177,831 | 12/1979 | Benjamin | 137/513.5 |

*Primary Examiner*—Martin P. Schwadron
*Assistant Examiner*—Sheri Novack
*Attorney, Agent, or Firm*—Browdy and Neimark

[57] ABSTRACT

A tube valve having a tube that closes the valve by being moved to a position juxtaposed to an impervious support structure having a traversing impervious barrier and that opens the valve by being moved away from the support structure wherein the "water hammer" effect is minimized by tube movement resistance generated by the barrier configuration.

10 Claims, 6 Drawing Figures

TUBE-DIAPHRAGM VALVE

This invention is concerned with flow valves and more particularly with the type of flow valves known as tube valves.

Tube valves are axial flow valves wherein a tube or sleeve is used for controlling flow through the valves. Such valves are shown for example in U.S. Pat. Nos. 3,942,756 and 3,838,704. Tube valves generally have a pervious cage-like core extending from an inlet to an outlet of a casing surrounding the core. A resilient tube is fitted over the core between the casing and the core. A control chamber defined between the casing and the tube is used for operating the valve between closed and open positions. The closed position occurs when the tube abuts a central impervious barrier portion that transverses the longitudinal direction of the cage-like core.

The tube valves give excellent control over large volume flows. They are characterized by good reliability and longevity. The prior art tube valves are prone to the phenomena known as "water hammer". The water hammer problem can be diminished by using larger valves per volume of flow being controlled. When larger valves are used the head loss through the valve increases in addition to the inherent additional costs of the larger valve.

Thus there is a problem of long-standing in reducing "water hammer effect" and still minimizing the size of the tube valves.

It is an object of the present invention to provide new and improved tube valves in which the above-referred to disadvantages are substantially reduced or overcome.

According to the present invention a tube valve is provided comprising:
 valve casing means;
 first and second port means longitudinally spaced apart in said casing means;
 a hollow support structure having pervious walls in a longitudinal direction between said port means;
 an impervious barrier transversing the longitudinal direction of said structure positioned to cause flow through said pervious walls and around said barrier;
 tube means surrounding said structure and extending substantially from first port means to second port means;
 said tube means having a valve closed position abutting said barrier thereby preventing flow around said barrier and a valve opened position removed from said barrier thereby enabling flow around said barrier;
 said casing means and said tube means defining a control chamber;
 aperture means in said casing to enable varying the pressure in said control chamber to move said tube means, said closed and said opened positions; and
 said barrier adapted to control resistance to the movement of said tube means from said open position to said closed position thereby damping any water hammer effect caused by said movement.

A further feature of the invention provides certain flow passageways in said barrier to further control the change in characteristics of the tube movements to overcome the inherent water hammer effect.

Figure 2:
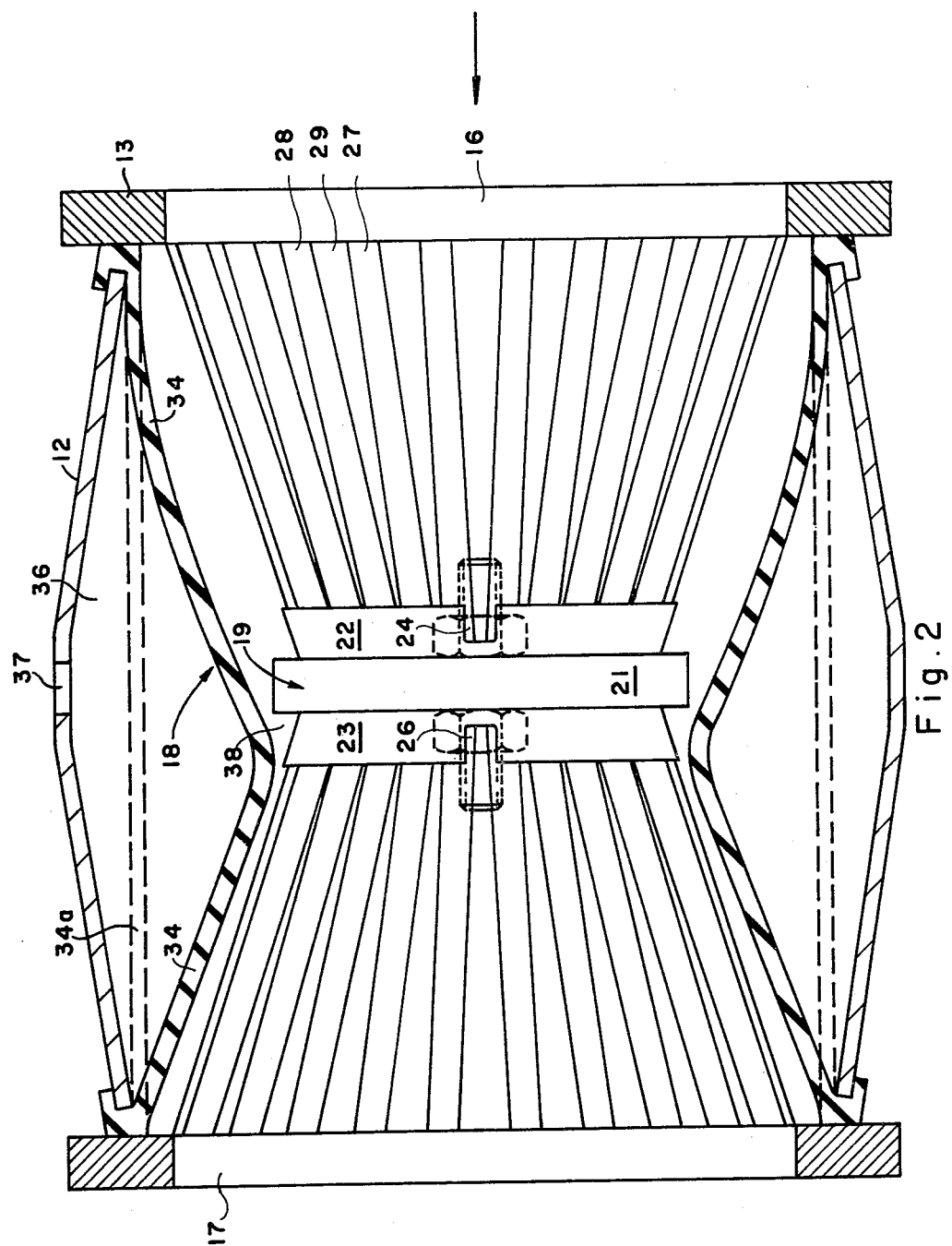
Figure 3A:
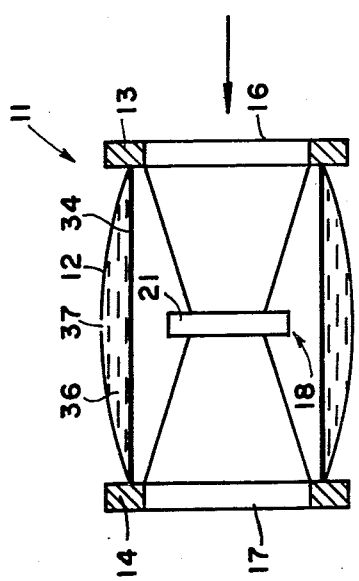
Figure 3B:
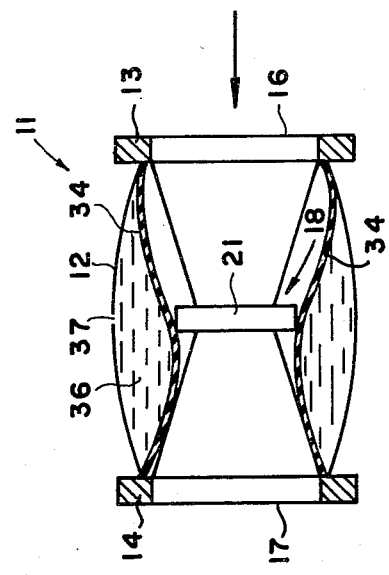
Figure 4A:
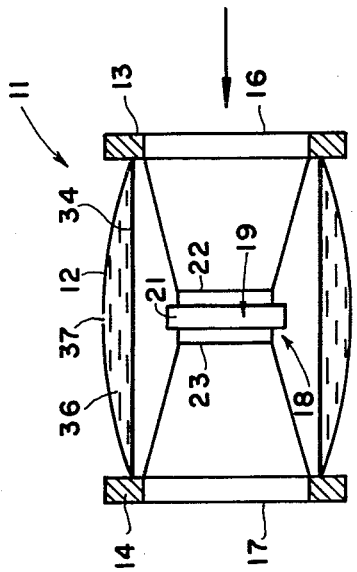
Figure 4B:
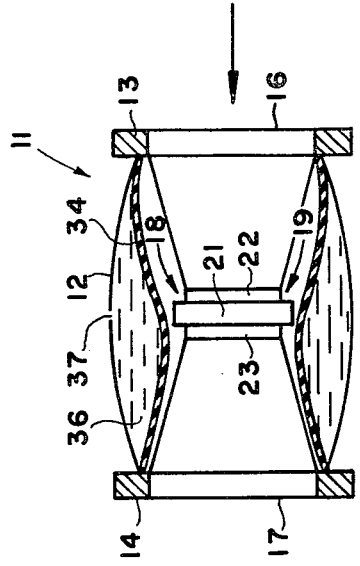

The operation and utilization of the present invention will be more fully apparent from the description of a preferred embodiment taken in conjunction with the accompanying drawings, in which:

FIG. 1 is a cross-sectional view of the inventive tube valve showing it in the closed position and the complete open position, FIG. 2 is a cross-sectional view of the same valve showing it in the process of closing, FIGS. 3a and 3b are schematic showings of prior art tube valves to illustrate the water hammer effect, and FIGS. 4a and 4b are schematic showings of the improved tube valve in the process of closing to illustrate how the water hammer effect is minimized.

In FIG. 1 the tube valve 11 is shown in cross-section view in its normal closed position. The valve comprises a casing having an outer wall 12 and end closures 13 and 14. The end closures are shown as having an inlet port 16 in end closure 13 and an outlet port 17 in end closure 14. It should be understood while 16 is referred to herein as an inlet port and 17 as an outlet port, the valve is shown as being symmetrically constructed so that flow can occur in either direction.

The valve further comprises a central core shown generally as 18. The core is comprised of a cage-like structure made up of an annular array of fingers extending from end closure 13 to a central barrier assembly 19 and from end closure 14 to the central barrier assembly 19.

The central barrier assembly 19 is shown as comprised of a centrally disposed cylindrical section 21 which has a larger diameter than a pair of truncated conical sections 22 and 23 on the inlet and outlet sides of the central cylindrical section 21, respectively. The conical sections 22 and 23 have their smaller diameters on those portions of the conical sections that abut the cylindrical section. Accordingly the conical sections flare away from the cylindrical section and grow larger as they extend towards the ends of the valve. The conical sections 22 and 23 also have peripheral slots therein shown as slots 24 and 26 on sections 22 and 23, respectively. These slots add to the damping effect that the conical sections have on the movement of the tubing. It should be noted that while two slots are shown, one on each of the conical sections, more slots can be utilized or the area (the cross-sectional area) of the slot can be varied, depending on the characteristic reaction desired from the valve.

The cage structure 18 is shown as comprising the annular array of fingers such as fingers 27 and 28 on the inlet side defining an inflow slot 29 and such as fingers 31 and 32 on the outlet side defining an outflow slot 33. The cage is normally abutted by the sleeve or tube 34 which is an elastic member normally stretched tightly over the cage so as to abut the central barrier assembly 19 and prevent any flow from the inlet to the outlet.

The casing 12 and the tube 34 define a control chamber 36. An aperture means, such as aperture 37 in casing 12 provides an entrance way to the control chamber. When the control chamber is attached to a fluid source at the same pressure as the inlet fluid supply, then the valve is retained in the closed position shown in the full line drawing of FIG. 1. If however the control chamber 36 is attached to a drain so that the inlet pressure is greater than the pressure in the control chamber, the valve then opens and the tube assumes the dashed line shape shown at 34a, for example. The valve can be used for throttling purposes in which case the tube assumes a position somewhere between the position of tube shown in 34 and 34a.

Note that the tube 34 is shown as held between the end closures and the casing. The manner of retaining the tube in place could be done in any manner well known to those skilled in the art.

FIG. 2 shows the valve in the process of closing. To better show the improved features provided by the novel central barrier assembly 19, the numerical designations in FIG. 2 are the same as those of FIG. 1 wherever possible. In FIG. 2 the aperture 37 has been connected to the line pressure that is also connected to inlet 16. Accordingly, the control chamber 36 is at line pressure. Then the tube 34 moves towards the cage assembly on the outlet side much faster than it does on the inlet side. Because of the head loss across the barrier assembly 19 there is less pressure from the interior of the core toward the casing on the outlet side than there is on the inlet side.

Therefore the tube on the inlet side moves more slowly toward the core than does the tube on the outlet side.

The relative motion of the tube towards the core when the compartment and the inlet have the same applied pressure is shown in FIGS. 3 and 4. Initially when the control compartment pressure and inlet pressure are equal there is no distinguishable difference in the motion of the tubes between the prior art valves and the inventive valves. This is illustrated by comparing FIG. 3a and FIG. 4a. In both figures the tube has moved to a relatively horizontal position and the compartment is filled with hydraulic fluid, i.e. water.

However, as the tube gets closer to the outlet corner of the cylindrical section 21 in the prior art valve, the head drop through the valve increases. Consequently the pressure in the control chamber in the prior art valves forces the tube on the outlet side into juxtaposition with the cage at an ever accelerating rate. Thus the outlet side tube drops down to the cage so as to cause the "water hammer" effect.

The new valve of FIG. 4 has the side conical section which slows the tubes descent on the outlet side thereby preventing water hammer.

Note that while sections 22 and 23 are shown as having conical shapes they could also be cylindrical, and produce the desired effects. Similarly they can be wall-like sections or disc-like sections. The major diameter of sections 22 and 23 should however be less than the diameter of central section 21. Also if one side of the valve is always the outlet then only one side section is required, that is of course on the outlet side.

The slots, shown as 24 and 26 are also important to mute the hammer effect. The slots can be of different sizes or more than one slot can be provided depending on the rating of the valve.

The valve provided retains the relatively small physical dimensions of the tube valves but by slowing the movement of the tube 34 on the outlet side, the hammer effect is minimized, or muted.

Accordingly a flowthrough tube valve is provided that does not suffer from the usual hammer effect which has been known to cause extensive damage to hydraulic systems as well as to the valve. The muting of the hammer effect is accomplished without enlarging the size of the valve and without materially changing the reaction time of the diaphragm.

While the principles of the invention have been described above in connection with the specific apparatus and applications, it is to be understood that this description is made by way of example only and not as a limitation on the scope of the invention.

I claim:

1. A tube valve for controlling hydraulic flow therethrough, said valve comprising:
   valve casing means,
   first and second port means spaced apart in said casing means along a longitudinal axis, definable as a first axis,
   a hollow support structure having pervious walls extending between said port means,
   an impervious stationary barrier transversing said structure along said first axis and positioned to cause hydraulic fluid to flow through said pervious walls and around said barrier,
   resilient tube means surrounding said structure and extending substantially from port to port,
   said tube means having a valve closed position when abutting said barrier thereby preventing flow around said barrier and a valve opened position remote from said barrier thereby enabling flow around said barrier,
   said casing and said tube means defining a control chamber,
   aperture means in said casing to enable varying the pressure in said control chamber to move said tube means between said valve closed position and said valve opened position, and
   said barrier comprising a central member against which said tube means abuts when said valve is in said closed position, and at least a first side member in contact with said central member and being disposed on the side of the port, serving as the outlet port, the dimension of said central member being greater than the dimension of said first side member in a direction transverse to said first axis, whereby as said tube means moves toward said valve closed position the differences between the dimensions of said central member and side member of said barrier transverse to said first axis results in the production of a pressure adjacent the central member on the side of the outlet port which dampens the hammer effect by reducing the rate at which said tube means comes in contact with said central member,
   said first side member being shaped as a truncated cone with the truncated top in contact with said central member with the dimension of the base of said truncated cone in a direction transverse to said first axis being less than the dimension of said central member, whereby the pressure and the space between the exposed side of said central member and the exposed side of said truncated cone and the tube means when the latter moves toward said central member to be in the valve closed position is greater than the pressure in the portion of said hollow support structure between said barrier and the port serving as the outlet port and is less than the pressure in the structure portion between said barrier and the port serving as the inlet port.

2. A tube valve as claimed in claim 1 wherein said truncated cone has n peripheral slots extending inwardly from the base thereof, where n is an integer not less than one.

3. A tube valve as claimed in claim 2 wherein the truncated cone is hollow.

4. A tube valve as claimed in claim 1 wherein said barrier includes a second side member in the shape of a truncated cone and disposed on the opposite side of said central member and substantially identical with said first side member.

5. A tube valve as claimed in claim 4 wherein at least one of said truncated cones has n peripheral slots extending inwardly from the base thereof, where n is an integer not less than one.

6. A tube valve as claimed in claim 4 wherein at least one of the truncated cones is hollow.

7. A tube valve for controlling hydraulic flow therethrough, said valve comprising:
   valve casing means,
   first and second port means spaced apart in said casing means along a longitudinal axis, definable as a first axis,
   a hollow support structure having pervious walls extending between said port means,
   an impervious stationary barrier transversing said structure along said first axis and positioned to cause hydrualic fluid to flow through said pervious walls and around said barrier,
   resilient tube means surrounding said structure and extending substantially from port to port,
   said tube means having a valve closed position when abutting said barrier thereby preventing flow around said barrier and a valve opened position remote from said barrier thereby enabling flow around said barrier,
   said casing and said tube means defining a control chamber,
   aperture means in said casing to enable varying the pressure in said control chamber to move said tube means between said valve closed position and said valve opened position, and
   said barrier comprising a central member against which said tube means abuts when said valve is in said closed position, and at least a first side member in contact with said central member and being disposed on the side of the port, serving as the outlet port, the dimension of said central member being greater than the dimension of said first side member in a direction transverse to said first axis, whereby as said tube means moves toward said valve closed position the differences between the dimensions of said central member and side member of said barrier transverse to said first axis results in the production of a pressure adjacent the central member on the side of the outlet port which dampens the hammer effect by reducing the rate at which said tube means comes in contact with said central member,
   said first side member and said central member being shaped as cylinders, each of preselected height in the direction of said first axis, with the diameter of said side member being less than the diameter of said central member.

8. A tube valve as claimed in claim 7 wherein said barrier includes a second side member, substantially identical to said first side member, said central and side members being coaxial and the side members being on opposite sides of said central member.

9. A tube valve as claimed in claim 8 wherein at least one of said side members defines n peripheral slots extending from the side remote from said central member.

10. A tube valve as claimed in claim 8 wherein at least one of said side members is hollow.

* * * * *